United States Patent
Zavalishin et al.

(10) Patent No.: US 11,238,302 B2
(45) Date of Patent: Feb. 1, 2022

(54) METHOD AND AN APPARATUS FOR PERFORMING OBJECT ILLUMINATION MANIPULATION ON AN IMAGE

(71) Applicant: Samsung Electronics Co., Ltd., Suwon-si (KR)

(72) Inventors: Sergey Stanislavovich Zavalishin, Moscow (RU); Vladimir Gennadievich Kurmanov, Moscow (RU); Artem Sergeevich Migukin, Moscow (RU); Ivan Olegovich Karacharov, Moscow (RU); Aleksei Mikhailovich Gruzdev, Moscow (RU); Dmitry Valerievich Polubotko, Moscow (RU); Ilya Vasilievich Kurilin, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 16/524,671

(22) Filed: Jul. 29, 2019

(65) Prior Publication Data
US 2020/0042820 A1    Feb. 6, 2020

(30) Foreign Application Priority Data
Aug. 1, 2018 (RU) .......................... RU2018128206

(51) Int. Cl.
*G06K 9/46* (2006.01)
*G06T 5/00* (2006.01)
*G06T 5/40* (2006.01)

(52) U.S. Cl.
CPC ............ *G06K 9/4661* (2013.01); *G06T 5/002* (2013.01); *G06T 5/40* (2013.01); *G06T 2207/10028* (2013.01); *G06T 2207/30201* (2013.01)

(58) Field of Classification Search
CPC . G06T 5/002; G06T 5/40; G06T 2207/10028; G06T 2207/30201;
(Continued)

(56) References Cited

U.S. PATENT DOCUMENTS 6,028,960 A    2/2000   Graf et al.
6,950,104 B1    9/2005   Marschner et al.
(Continued)

FOREIGN PATENT DOCUMENTS

CN      101425179 A      5/2009
CN      107506714     * 12/2017
(Continued)

OTHER PUBLICATIONS

"Face illumination manipulation using a single reference image by adaptive layer decomposition". Xiaowu Chen et al. Nov. 2013 IEEE (Year: 2013).*
(Continued)

*Primary Examiner* — Nancy Bitar
(74) *Attorney, Agent, or Firm* — Jefferson IP Law, LLP

(57) ABSTRACT

A method and an illumination manipulation device of performing an object illumination manipulation operation on a first image are provided. The method includes receiving the first image and an input of a light direction, generating a second image with a first object detected from the first image, determining a second object illumination of the second image based on the light direction and replacing a first object illumination of the first image with the second object illumination.

21 Claims, 17 Drawing Sheets

(58) Field of Classification Search
CPC ........... G06T 15/50; G06T 5/007; G06T 5/50; G06T 19/00; G06T 5/008; G06K 9/4661; G06K 9/00228; G06K 9/00597; G06K 9/00248; G06K 9/00302; G06K 9/36; H04N 9/44

See application file for complete search history.

(56) References Cited

U.S. PATENT DOCUMENTS

| | | |
|---|---|---|
| 7,098,920 B2 | 8/2006 | Marschner et al. |
| 7,129,949 B2 | 10/2006 | Marschner et al. |
| 7,227,977 B1 | 6/2007 | Dotsenko |
| 7,324,688 B2 | 1/2008 | Moghaddam |
| 7,433,807 B2 | 10/2008 | Marschner et al. |
| 7,609,860 B2 | 10/2009 | Lee et al. |
| 7,848,544 B2 | 12/2010 | Mariani |
| 8,009,880 B2 | 8/2011 | Zhang et al. |
| 8,090,160 B2 | 1/2012 | Kakadiaris et al. |
| 8,090,161 B2 | 1/2012 | Kaplan |
| 8,116,538 B2 | 2/2012 | Kim et al. |
| 8,175,410 B2 | 5/2012 | Park et al. |
| 8,184,914 B2 | 5/2012 | Kyyko et al. |
| 8,582,896 B2 | 11/2013 | Ionita et al. |
| 8,619,151 B2 | 12/2013 | Park et al. |
| 8,792,679 B2 | 7/2014 | Sengupta et al. |
| 9,017,080 B1 | 4/2015 | Placik |
| 9,232,189 B2 | 1/2016 | Shaburov et al. |
| 9,437,035 B2 | 9/2016 | Free |
| 9,679,192 B2 | 6/2017 | Luo et al. |
| 9,858,654 B2 | 1/2018 | Polichroniadis |
| 2003/0007685 A1 | 1/2003 | Tsai et al. |
| 2005/0083248 A1 | 4/2005 | Biocca et al. |
| 2007/0110305 A1* | 5/2007 | Corcoran ............ H04N 5/23229 382/167 |
| 2009/0003661 A1 | 1/2009 | Ionita et al. |
| 2011/0102553 A1 | 5/2011 | Corcoran et al. |
| 2011/0305388 A1* | 12/2011 | Wedi ........................ G06T 5/005 382/165 |
| 2013/0050214 A1 | 2/2013 | Free |
| 2013/0129190 A1 | 5/2013 | Cohen et al. |
| 2013/0182920 A1 | 7/2013 | Ionita et al. |
| 2016/0070952 A1* | 3/2016 | Kim .................... G06K 9/00208 382/118 |
| 2018/0046854 A1 | 2/2018 | Kittler et al. |
| 2018/0061028 A1* | 3/2018 | Sunkavalli ................ G06T 5/50 |
| 2018/0211440 A1 | 7/2018 | Kunkel et al. |

FOREIGN PATENT DOCUMENTS

| | | |
|---|---|---|
| KR | 100399286 B1 | 9/2003 |
| RU | 2 402 811 C2 | 10/2010 |

OTHER PUBLICATIONS

International Search Report dated Nov. 13, 2019, issued in International Patent Application No. PCT/KR2019/009562.

Yang et al., "Face Image Illumination Transfer through Eye-Relit 3D Basis", 2013 13th International Conference on Computer-Aided Design and Computer Graphics, Nov. 16, 2013, XP032595584, IEEE.

Extended European Search Report dated May 7, 2021, issued in European Patent Application No. 19844746.8.

Min et al. "Fast global image smoothing based on weighted least squares," IEEE Transactions on Image Processing 23.12, Oct. 2014.

Russian Search Report dated Mar. 6, 2019, issued in Russian Patent Application No. 2018128206.

Russian Decision on Grant dated Jun. 28, 2019, issued in Russian Patent Application No. 2018128206.

\* cited by examiner

METHOD AND AN APPARATUS FOR PERFORMING OBJECT ILLUMINATION MANIPULATION ON AN IMAGE

CROSS-REFERENCE TO RELATED APPLICATION(S)

This application is based on and claims priority under 35 U.S.C. § 119(a) of a Russian patent application number 2018128206, filed on Aug. 1, 2018, in the Russian Intellectual Property Office, the disclosure of which is incorporated by reference herein in its entirety.

BACKGROUND

1. Field

The disclosure relates to manipulation of illumination of objects in images. More particularly, the disclosure relates to a method of performing object illumination manipulation on an image in a sequence of images and a user computing device implementing the method.

2. Description of Related Art

FIG. 1 is a general operation illustrating performing object illumination manipulation on an image according to the related art.

Methods for manipulation of illumination of an object in an image generally involve inputting an object image in operation S10, detecting object landmarks in operation S11, extracting object albedo and illumination in operation S12, changing the object illumination in operation S13, mixing the object albedo and changed illumination in operation S14, and applying the mixed object albedo and changed illumination to the object image in operation S15.

U.S. Pat. No. 7,324,688 B2 29 Jan. 2008, MITSUBISHI ELECTRIC RESEARCH LABORATORIES, INC., entitled "Face relighting for normalization of directional lighting," describes a method of performing illumination manipulation using a block-wise optimization algorithm to extract albedo and illumination maps for further normalization of face illumination. The main drawback of the approach disclosed in the '688 patent is the fact that unique facial features change as a result of applying the illumination manipulation method to a face image. Because of this, the face on the image, which has been subjected to this illumination manipulation method, becomes similar to the reference face used for such illumination manipulation.

Another U.S. Pat. No. 8,582,896 B2 12 Nov. 2013, DIGITALOPTICS CORPORATION EUROPE LIMIT etc., entitled "Separating directional lighting variability in statistical face modeling based on texture space decomposition," describes a method of decomposition of an image into albedo and illumination using a generic face model created with projections of Principle Component Analysis (PCA) to Uniform Light Subspace trained on the arbitrary image database. According to the descriptions of the '896 patent, this approach can remove illumination only to a certain extent. Furthermore, the '896 patent approach is unable to remove colored lighting and is not designed to process face images in high resolution.

Another U.S. Pat. No. 7,433,807 B2 7 Oct. 2008, MICROSOFT CORPORATION, entitled "Facial image processing," describes a method of processing facial images, which uses several flash lights to create a 3D face model and separate albedo from illumination on the basis of 3D model normals. The approach taught in the '807 patent requires lots of hardware that cannot be integrated into a user mobile device. Furthermore, the algorithm disclosed in the '807 patent must analyze several different images, therefore, it is computationally intensive and cannot be implemented in real-time.

Another U.S. Pat. No. 9,858,654 B2 02 Jan. 2018, ANTHROPICS TECHNOLOGY LIMITED, entitled "Image manipulation," describes a method of processing images, which forms a PCA-based 2D model that is fused with an input face image to produce an output image with new lighting controlled on the basis of PCA coefficients. The approach disclosed in the '654 patent is not able to remove harsh shadows and results in changing unique facial features in the image. In addition, the approach proposed in the '654 patent is quite slow (by reason of respective PortraitPro software) and cannot be exploited in real-time applications.

Other implementations are known in the art, but are unable to adequately solve the aforementioned problems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of performing object illumination manipulation on an image in a sequence of images and a user computing device implementing the method.

Additional aspects will be set forth in part in the description which follows and, in part, will be apparent from the description, or may be learned by practice of the presented embodiments.

In accordance with an aspect of the disclosure, methods of performing an object illumination manipulation operation on a first image are provided. The method includes receiving the first image and an input of a light direction, generating a second image with a first object detected from the first image, determining a second object illumination of the second image based on the light direction and replacing a first object illumination of the first image with the second object illumination.

In accordance with another aspect of the disclosure, an illumination manipulation device for performing an object illumination manipulation operation on a first image is provided. The device includes an input interface configured to receive the first image and an input of a light direction and a processor configured to generate a second image with a first object detected from the first image, determine a second object illumination of the second image based on the light direction and replace a first object illumination of the first image with the second object illumination.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
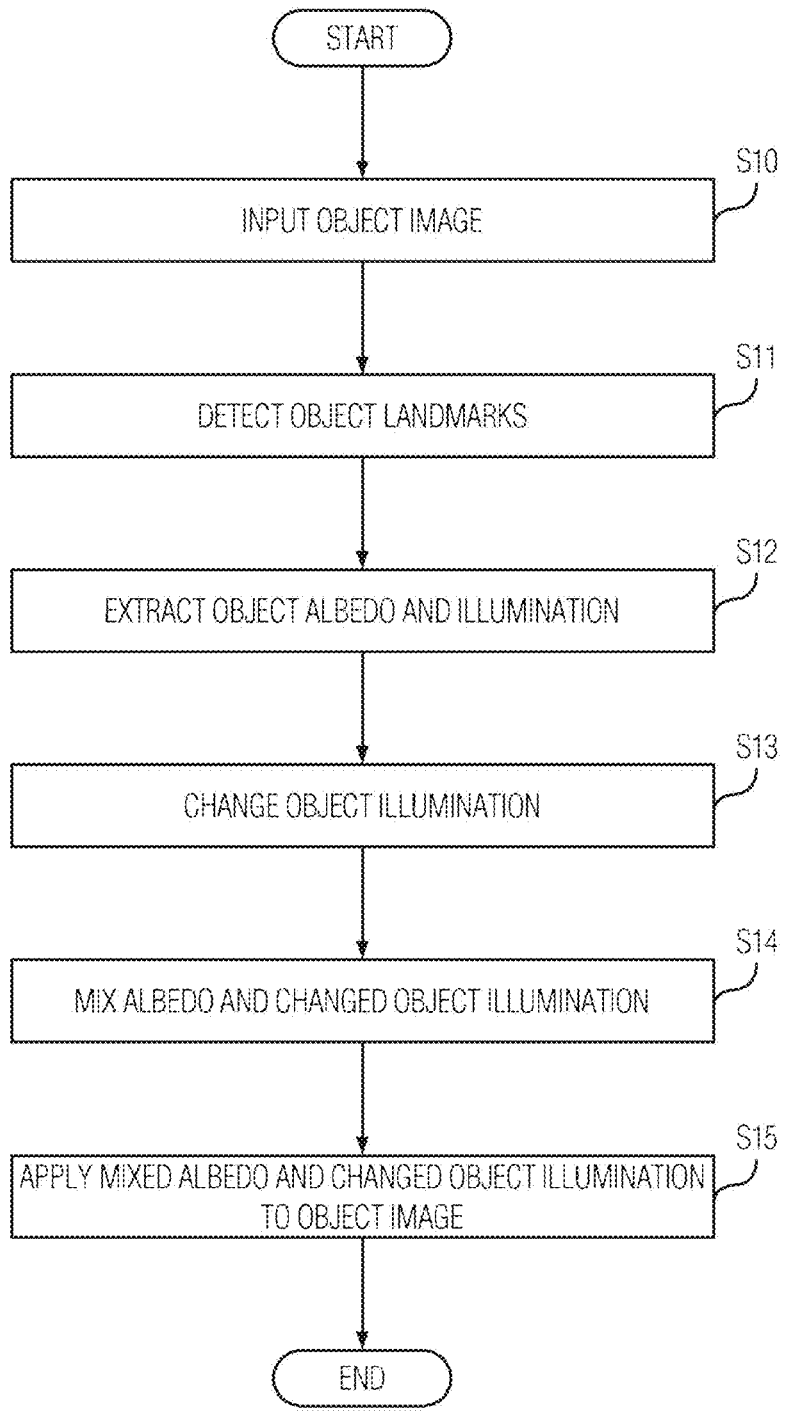
FIG. 1 is a general operation illustrating performing object illumination manipulation on an image according to the related art.
Figure 2:
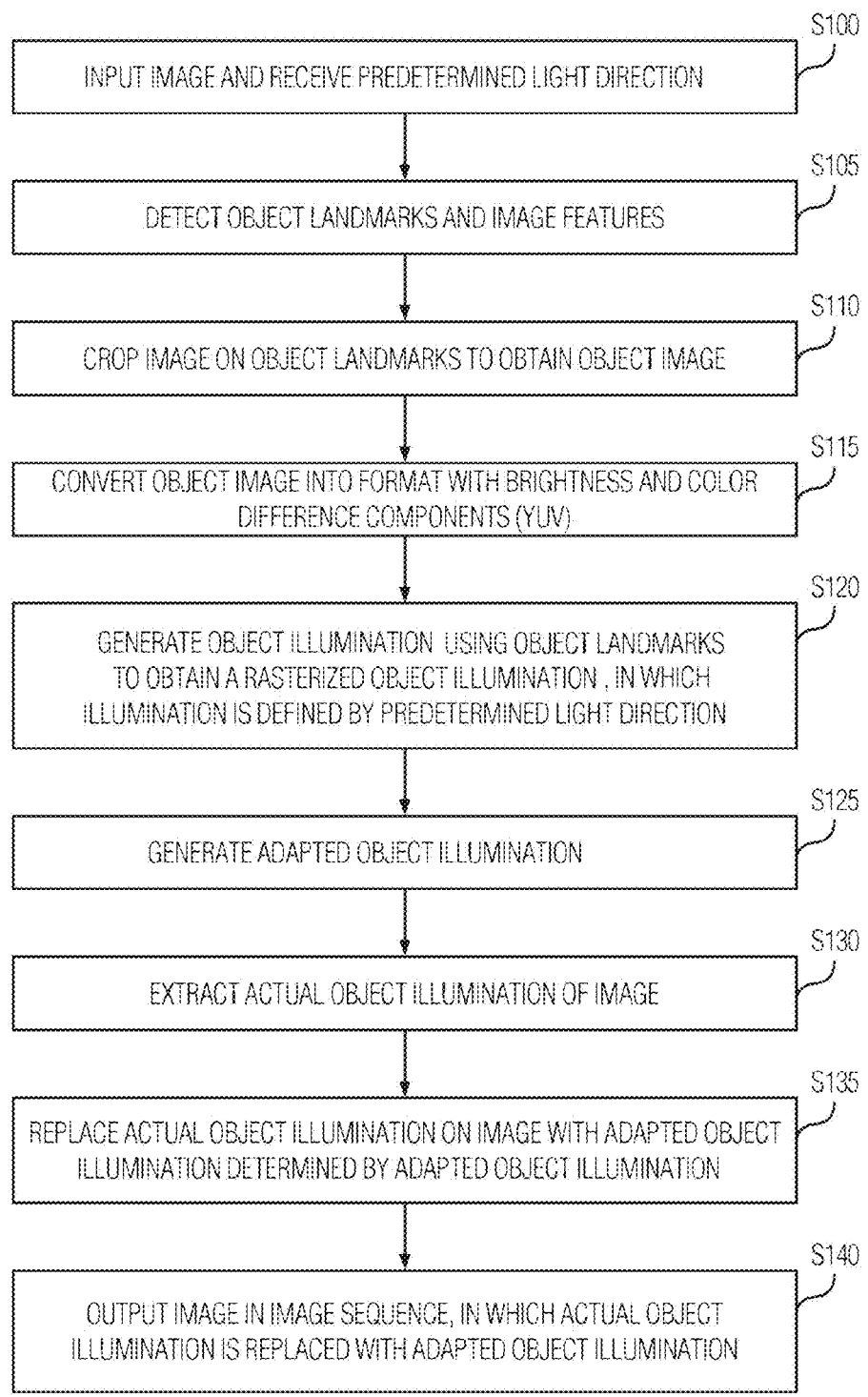
FIG. 2 is a flowchart of illustrating performing object illumination manipulation on an image in a sequence of images according to an embodiment of the disclosure.

FIG. 2 is a flowchart of illustrating performing object illumination manipulation on an image in a sequence of images according to an embodiment of the disclosure.

Referring to FIG. 2, a method is illustrated for real-time processing of an image to improve illumination and color of an object. The method beings in operation S100 by inputting the image and receiving a predetermined light direction. The predetermined light direction may be a default light direction or a user-defined light direction. In an embodiment, an object on the input image may be, but not limited to, a face, and the object surface may be a skin of the face. However, it should be appreciated that the disclosed illumination manipulation method can also be successfully applied to images containing any other object(s). To this end, a landmark detection algorithm using, for example, a support vector machine (SVM) or any other machine learning algorithm, can be trained on object landmarks whose illumination manipulation by the present method is of interest. After the image is input, a 3D mesh of the object can be prepared, and landmarks related to the object blobs can be marked. In the disclosure, an object may mean an object landmark.

The disclosure is based on Lambertian diffuse reflection law R=IS, where $R \in R^N$ is a result image, $I \in R^N$ is illumination, $S \in R^N$ is texture (albedo), and N is a number of image pixels. Therefore, the disclosure provides separating texture from illumination and substituting the original illumination map with a desired one. In operation S105, object landmarks $L=\{l_N\} \in R2$ and image features can be detected on input image.

Figure 8:
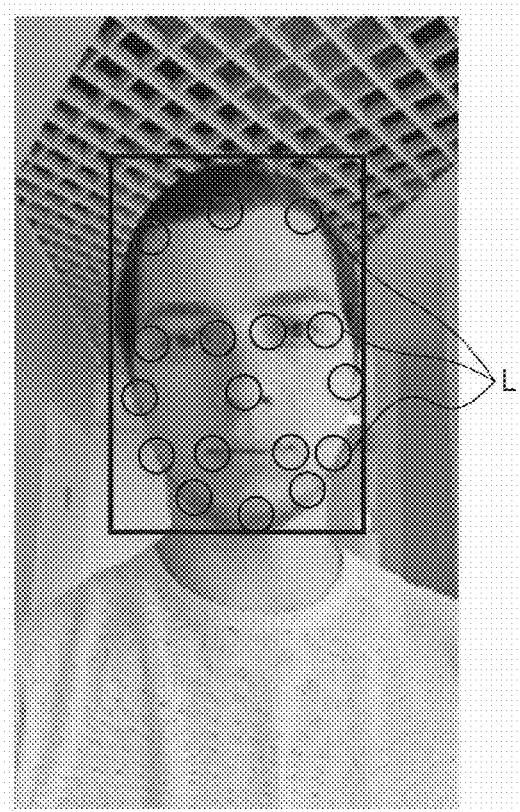
FIG. 8 is an example of detecting landmarks L on an input image according to an embodiment of the disclosure.

FIG. 8 shows an example of detecting landmarks according to an embodiment of the disclosure.

Referring to FIG. 8, value n is the number of landmarks and can be set to 68, but not limited to this specific value. In this context, object landmarks refer to the points projected onto the object image plane, which correspond to centers of object reference regions predetermined in accordance with a generic 3D view of the latter, for example, tip of nose, corners of lips and eyes, centers of pupils, and so on. Image features in this context refer to unique properties of the object texture, which are absent in the generic object.

Referring back to FIG. 2, in operation S110, the image can be cropped $R_1 \in R^N$ based on object landmarks to obtain an object crop image 5 including the entire object and its landmarks.

Figure 9:
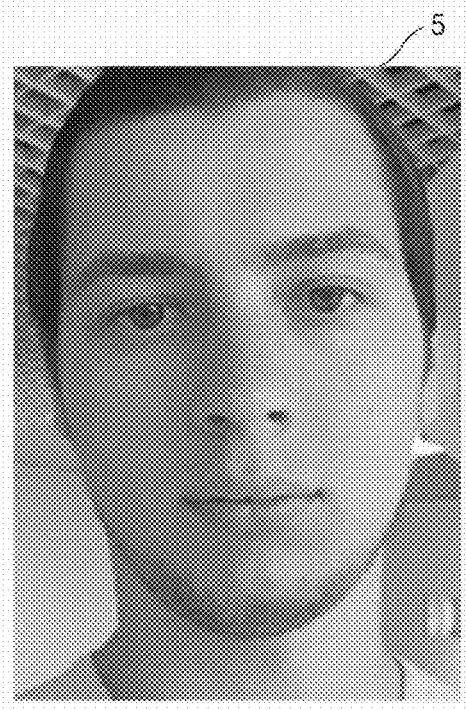
FIG. 9 is an example of a landmark crop image according to an embodiment of the disclosure.

FIG. 9 shows an example of a landmark crop image 5 according to an embodiment of the disclosure.

Referring to FIG. 9, operation S110 reduces the computational complexity of subsequent operations of the method by excluding regions not to be processed from input image.

Referring back to FIG. 2, in operation S115, the object image 5 can be converted into a format having with a brightness component and color difference components, for example, but not limited to, YUV NV21. In operation S120, an object illumination can be generated using the object landmarks to obtain a rasterized object illumination 25, in which illumination is defined by predetermined light direction 10. To generate the rasterized object illumination, a generic object 3D mesh 15 $V_g=\{v_g\}\in R^3$ is produced and fitted to the detected object landmarks L. Value m is the number of vertices of the 3D mesh and can be set to 3448, but not limited to this specific value. Illumination defined by the predetermined light direction $L\in R^3$ 10 can be applied to the fitted 3D mesh 15. Then, the adjusted object 3D mesh 15 can be rendered using the generic object texture $T\in R^M$ 20 and rasterized to form a rasterized object illumination 25. In other words, when processing a sequence of images, $V_g$ is fitted to L and rendering of each $n^{th}$ (may be 1, 2 or 4) image of the object 3D mesh 15 is performed using L and T to obtain an object illumination $M_r$ 25. Therefore, in video processing, rendering of a new 3D image is not performed on every frame and skips of a certain number of frames using the same image for intermediate frames to thereby save computational resources required to implement the method.

Figure 10:
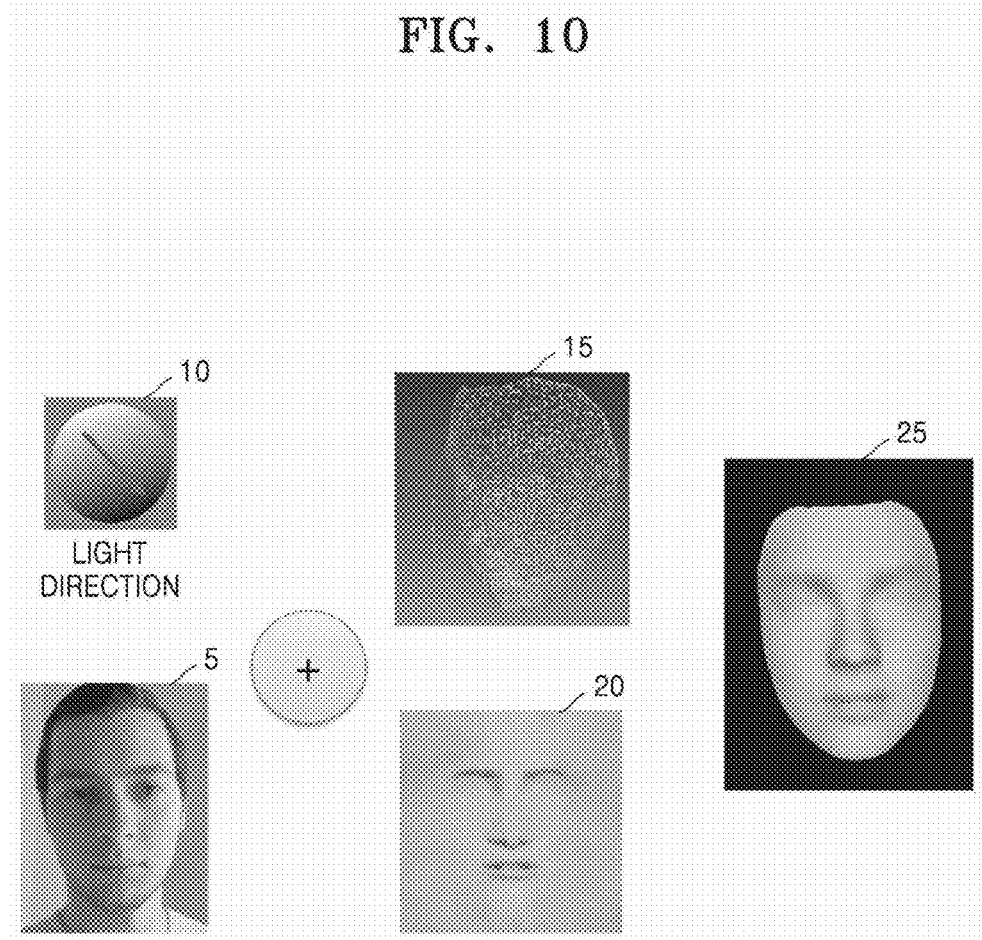
FIG. 10 is an example of generating a rasterized object illumination according to an embodiment of the disclosure.

FIG. 10 shows an example of generating a rasterized object illumination according to an embodiment of the disclosure.

Referring to FIG. 10, an object on image is a face, an object 3D mesh 15 is a 3D head mesh, the generic object texture 20 is a generic face texture, and the rasterized object illumination 25 is a rasterized face illumination.

Figure 6:
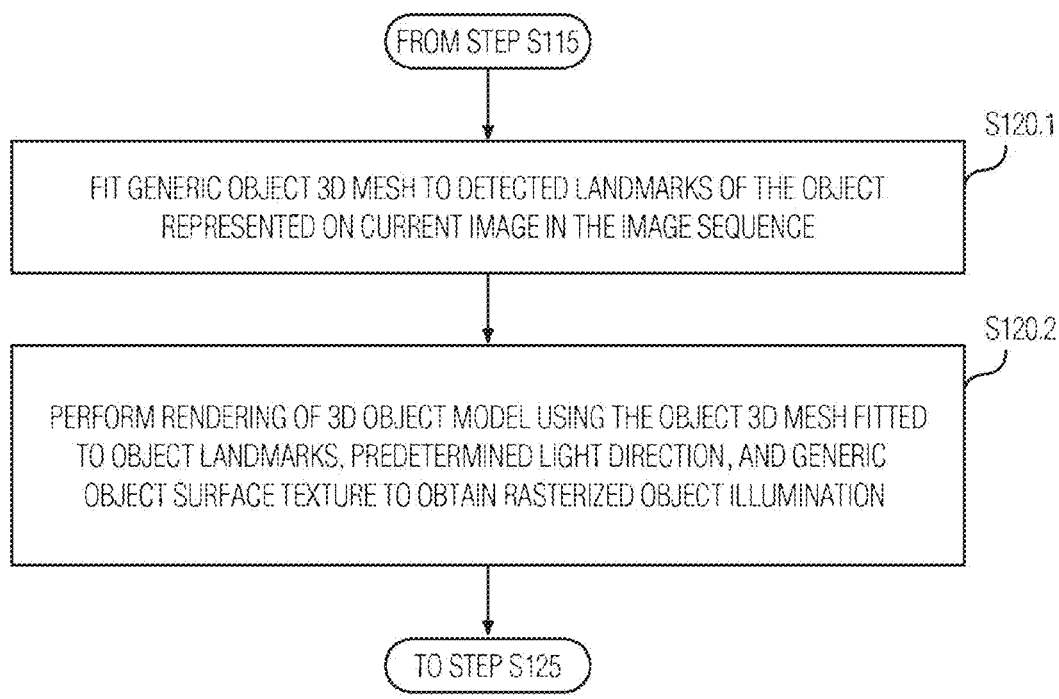
FIG. 6 is a flowchart of generating an object illumination using object landmarks to obtain a rasterized object illumination in which illumination is defined by a predetermined light direction according to an embodiment of the disclosure.

FIG. 6 is a flowchart of generating an object illumination using object landmarks to obtain a rasterized object illumination in which illumination is defined by a predetermined light direction according to an embodiment of the disclosure.

Referring to FIG. 6, an example flowchart of operation S120 is illustrated. In operation 120.1, a generic object 3D mesh may be fitted to the detected landmarks of the object represented on a current image in the image sequence. In operation 120.2, a rendering of a 3D object may be performed using the object 3D mesh fitted to object landmarks, predetermined light direction, and generic object surface texture to obtain the rasterized object illumination.

Referring back to FIG. 2, after obtaining the rasterized object illumination, the method generates the adapted object illumination in operation S125.

Figure 3:
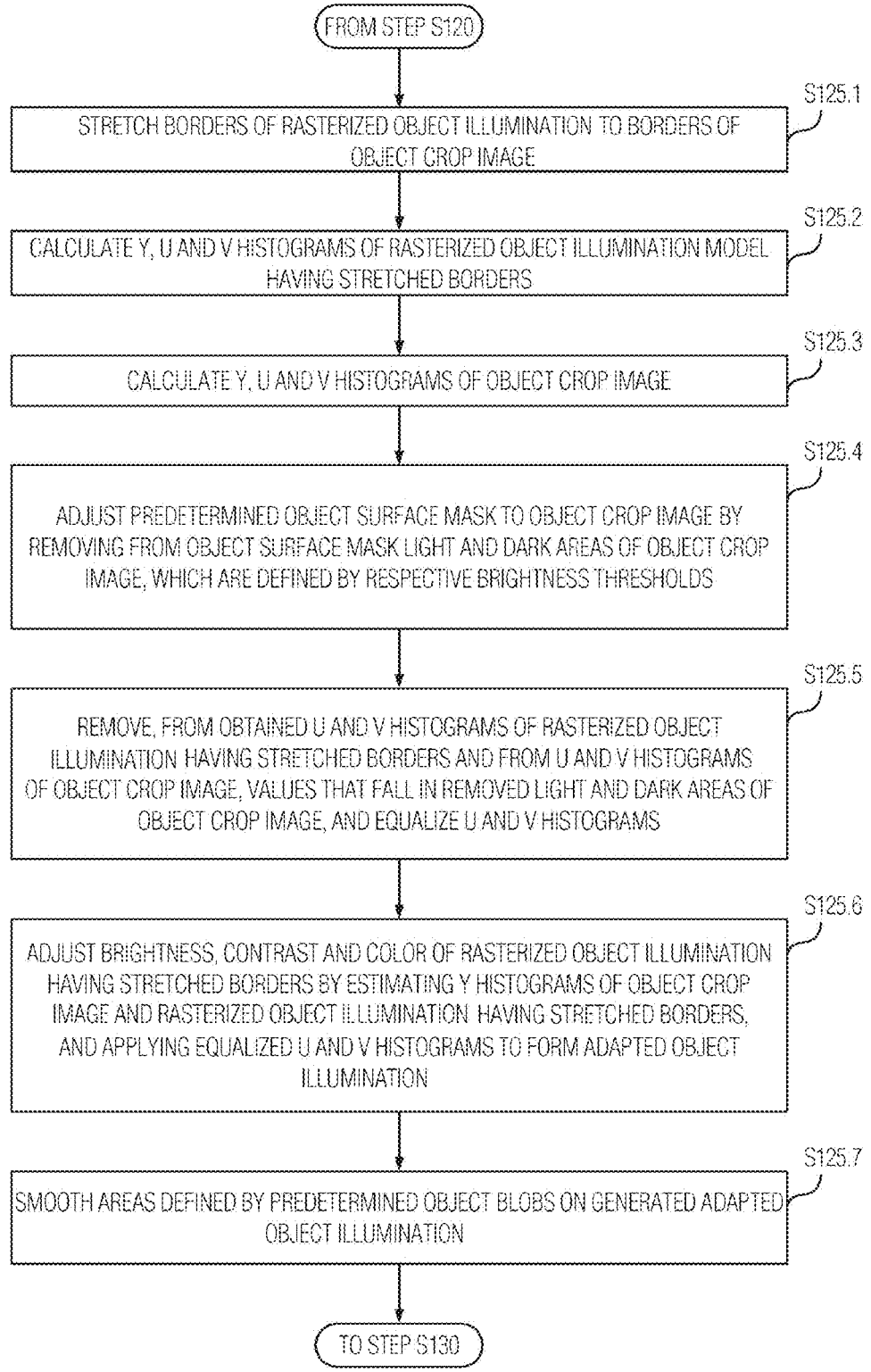
FIG. 3 is a flowchart illustrating generating an adapted object illumination according to an embodiment of the disclosure.

FIG. 3 is a flowchart illustrating generating an adapted object illumination according to an embodiment of the disclosure.

Referring to FIG. 3, an example flowchart of operation S125 is illustrated. In operation S125, an adapted object illumination $M\in R^N$ 40 can be generated. The goal of operations S120 and S125 is to render the target object illumination on the basis of the generated object 3D mesh, the shape and color of which are fitted to the object input image. In operation S125.1, borders of the rasterized object illumination 25 can be stretched to borders of the object crop image, i.e. image $M_r$ is stretched to obtain image $M_s$. That is, the rasterized object illumination 25 can be resized to match a size of the object crop image. To this end, in an embodiment of the disclosure, for each pixel $p_b$ of an image border $M_r$ a first nonzero pixel $p_0$ is found on a line representing a line or column of pixels of image $M_r$, which is orthogonal to the border. If $p_0$ pixel exists, a number of nonzero pixels (up to 9 pixels) is removed in $/p_b p_0$ direction to obtain internal pixel $p_1$, and pixels $p_0 p_1$ are interpolated to $p_b p_1$. This operation is performed to exclude from the image of the rendered object illumination 25 black area outside the object, resulting from rendering the object illumination 25, and to make easier the inpainting (i.e., repainting) of the relighted object image, resulting from execution of the disclosed method, into the corresponding image in the input image sequence. Operation S125.1 also enables processing a high-resolution video stream by the present method in real time, since the complexity of inpainting the relighted object image resulting from the method into the corresponding image in the input image sequence is substantially reduced.

Figure 11:
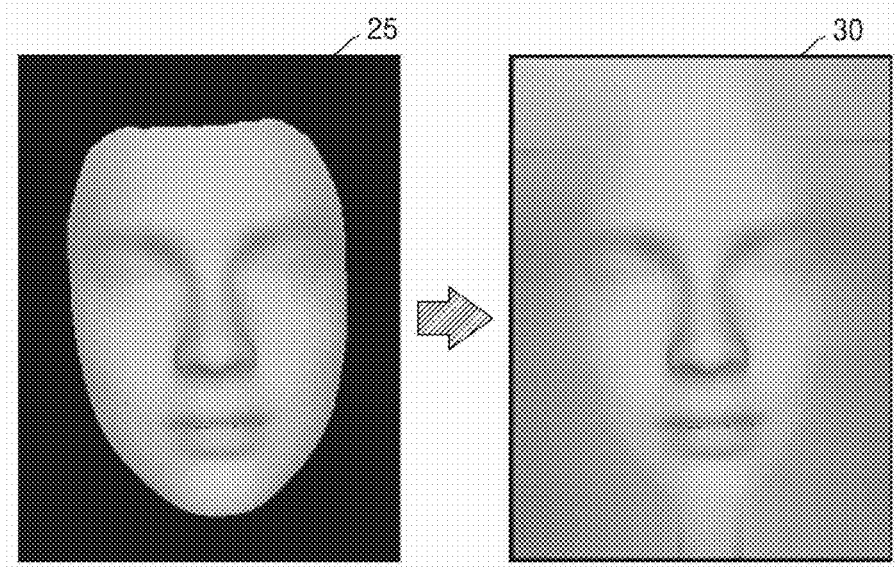
FIG. 11 is an example of stretching a rasterized object illumination according to an embodiment of the disclosure.

FIG. 11 illustrates an example of stretching a rasterized object illumination to form a rasterized object illumination with stretched borders according to an embodiment of the disclosure.

Referring back to FIG. 3, in operations S125.2 and S125.3, the Y, U and V histograms ($H_{YM}$, $H_{UM}$, $H_{VM}$) of the rasterized object illumination $M_S$ 30 with stretched borders and Y, U and V histograms ($H_{YR}$, $H_{UR}$, $H_{VR}$) of the object crop image $R_1'$ 5 can be computed, respectively. Computation of the histograms can be performed by any method. In operation S125.4, predetermined object surface mask $A_r\in R^N$ can be adjusted to the object crop image 5 by removing from the object surface mask light and dark areas of the object crop image 5, which are defined by respective brightness thresholds. To this end, in an embodiment of the disclosure, the object surface mask $A_r$ is adjusted to obtain an adjusted object surface mask $A_{adj}=\{a_i, i=1 \ldots N\}$, wherein:

$$a_i = \begin{cases} 255, & ((A_r)_i < I_{hi}) \wedge ((A_r)_i > I_{sh} \wedge ((A_r)_i > 0), \\ 0, & \text{otherwise} \end{cases}.$$

$$\left(\sum_{i=0\ldots I_{sh}} h_i^{YR}\right) \to 0.3N,$$

$$\left(\sum_{i=255\ldots I_{hi}} h_i^{YR}\right) \to 0.3N, \text{ and}$$

$$H_{YR} = \{h_i^{YR}\}, \ i \in [0; 255]$$

The predetermined object surface mask is a binary object surface mask constructed by shading all the regions lying inside the convex polygon formed by the object landmarks. The predetermined object surface mask is used to find the image region containing the object surface. Removal of light and dark areas of the object crop image 5 from the object surface mask is performed to exclude object surface regions containing invalid information about illumination and color of the object. Respective brightness thresholds for removing light and dark areas from the object surface mask can be determined empirically.

In an embodiment of the disclosure, the object surface mask $A_r$ can be formed on the basis of object landmarks L by generating an object face mask $A_f$ using object landmarks L except for the landmarks that correspond to brows, mouth and nose. Then, color factor can be estimated from the generated face mask $A_f$ and the object crop image 5. The estimation can comprise: creating an object surface probe mask $A_p$, which is a face mask with everything under nose and over brows removed; smoothing the object face surface image $R_p = F_{avg} * R_I'$ with averaging box filter of size 5, but not limited to this particular value, and calculating color factor:

$$\sigma_c^\pm = \text{median}(R_p^c \cap A_p) \cdot \left(1 \pm \sigma_0\left(\frac{\max(R_p^c \cap A_p)}{\text{median}(R_p^c \cap A_p)} - 1\right)\right), \text{ and}$$

$$c = \{Y, U, V\},$$

where $\sigma_0$ can be 1.1.

As the result, the object surface region $A_s$ defining the target object surface mask $A_r$ can be found: $A_s = \cap_c \{\sigma_c^- \leq R_p^c \leq \sigma_c^+\}$.

In an embodiment of the disclosure, where an object is an arbitrary object, but not a face, the object surface mask (i.e., a binary mask of the object surface) can be predetermined by shading all the regions lying inside the convex polygon formed by landmarks predetermined for the arbitrary object of interest.

In operation S125.5, values that have fallen in the removed light and dark areas of the object crop image 5, defined by adjusted object surface mask $A_{adf}$, can be deleted from obtained U and V histograms of the rasterized object illumination 30 with stretched borders and U and V histograms of the object crop image 5. In other words, in operation S125.5, zero pixels in $A_{adf}$ are removed from UV histograms and histograms $H_{UM}$, $H_{VM}$ are equalized. The removal of values that have fallen in the removed light and dark areas of the object crop image 5 from the obtained Y, U, and V histograms is performed to exclude the object surface regions containing invalid information about illumination and color of the object.

In operation S125.6, brightness, contrast, and color of the rasterized object illumination 30 with stretched borders can be adjusted by estimating Y histograms of the object crop image 5 and the rasterized object illumination 30 with stretched borders, and applying the equalized U and V histograms of the same images (i.e., the image of the rasterized object illumination 30 with stretched borders and the object crop image 5) to obtain an adapted object illumination 40 providing recolored lighting. The aforementioned application of equalized U and V histograms to form an adapted object illumination 40 comprises the use of their values for recoloring the illumination image. In other words, to generate adapted object illumination $M_c = \{m_n^c\}$ 40 in one embodiment, brightness $M_s = \{m_n^s\}$ is adjusted and equalized U and V histograms are determined as follows:

$$m_n^c = \left(\frac{m_n^s I_{mid}}{M_{mid}} - M_{sh}\right)\left(\frac{I_{hi} - I_{sh}}{M_{hi} - M_{sh}}\right) + I_{sh},$$

$$\left(\sum_{i=0\ldots M_{sh}} h_i^{YM}\right) \to 0.3N,$$

$$\left(\sum_{i=255\ldots M_{hi}} h_i^{YM}\right) \to 0.3N,$$

$$H_{YM} = \{h_i^{YM}\}, i \in [0; 255],$$

$$I_{mid} = \frac{\sum_{i=I_{sh}\ldots I_{hi}} h_i^{YI}}{\sum_{i=I_{sh}\ldots I_{hi}} i}, \text{ and}$$

$$M_{mid} = \frac{\sum_{i=M_{sh}\ldots M_{hi}} h_i^{YM}}{\sum_{i=M_{sh}\ldots M_{hi}} i}.$$

Operations S125.2-S125.6 also ensure easier inpainting of a relighted object image resulting from the method into respective image in the input image sequence. Furthermore, operations S125.2-S125.6 adapt target illumination to the brightness and color of a particular object input image, which generates an adapted object illumination 40 and provides a realistic relightening so that unique object features will be preserved in the object image, which will be inpainted into respective image in the image sequence. After forming the adapted object illumination in operation S125.6, the method generates adapted object illumination with smooth areas defined by predetermined object blobs in operation S125.7.

Figure 12:
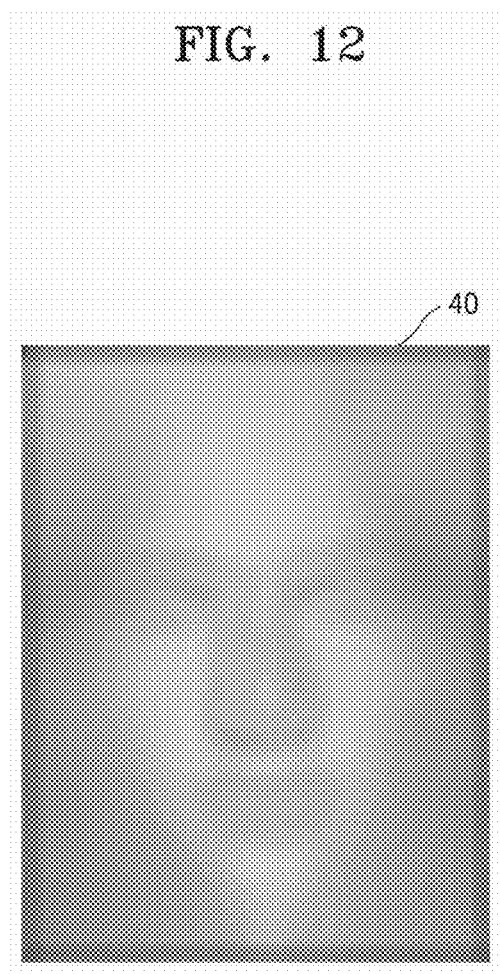
FIG. 12 is an example of a generated adapted object illumination with smooth areas defined by predetermined object blobs according to an embodiment of the disclosure.

FIG. 12 is an example of a generated adapted object illumination with smooth areas defined by predetermined object blobs according to an embodiment of the disclosure.

Referring to FIG. 12, in operation S125.7, the areas defined by the predetermined object blobs can be smoothed on the adapted object illumination 40. In other words, in an embodiment of the disclosure, object blobs can be smoothed in operation S125.7:

$$M = A_m F_{avg}^B * M_c + (1 - A_m) F_{avg}^M * M_c, A_m = \min(A_b, F_{avg}^B * M_c),$$

where M is adapted object illumination 40 with smoothed object blobs. $F_{avg}^B$ and $F_{avg}^M$ are averaging box filters of sizes 0.25 w and 0.05 w, respectively. In this context, object blobs refer to regions defined by previously marked object landmarks corresponding to highly textured areas, for example, eyes, mouth, brows, tip of the nose, etc. In the embodiment where object is a face, the blobs include, but are not limited to, brows, eyes, nose and mouth. The smoothing is executed to prevent removal of blobs in subsequent operation of repainting the relightened object image into input image sequence.

FIG. 12 is an example of a generated adapted object illumination with smooth areas defined by predetermined object blobs according to an embodiment of the disclosure.

Referring to FIG. 12, an example of adapted object illumination 40 with smooth areas defined by the predetermined object blobs is shown.

Figure 4:
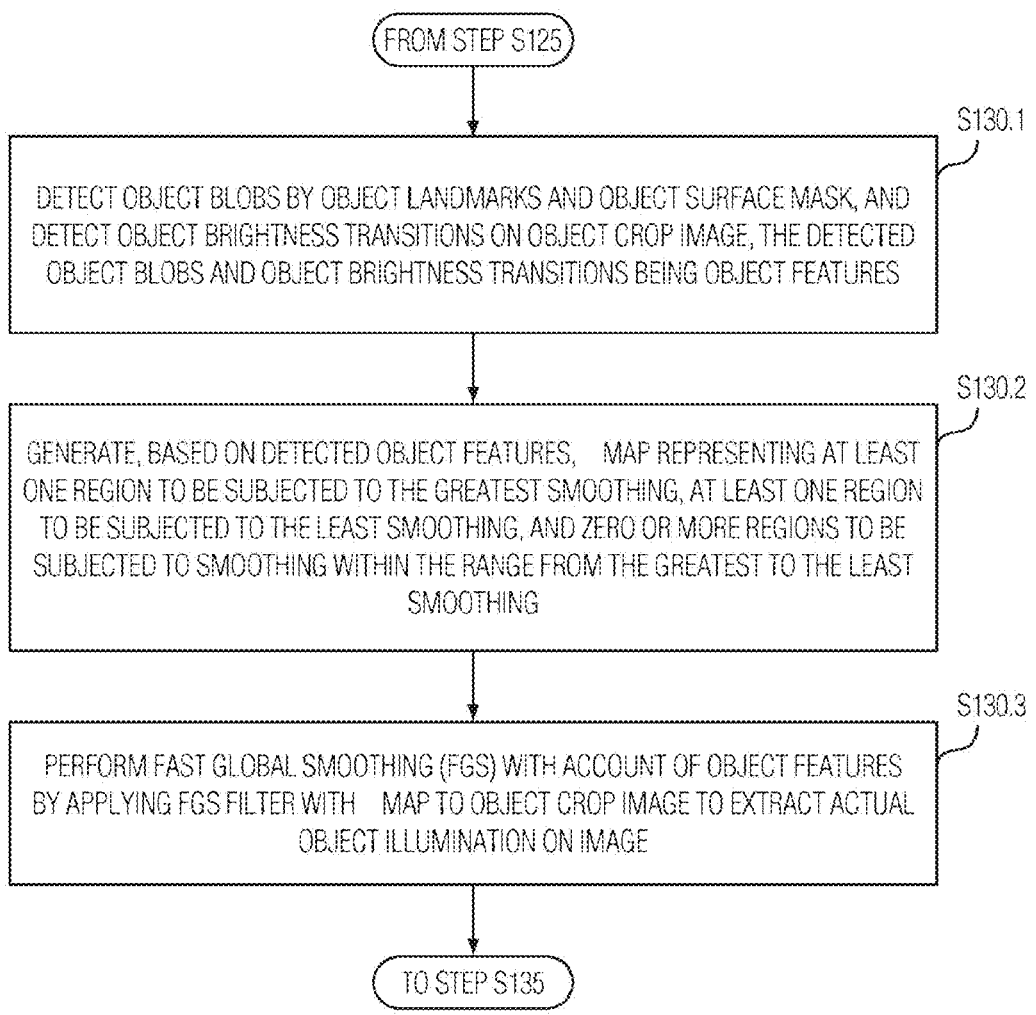
FIG. 4 is a flowchart of extracting actual object illumination of an image according to an embodiment of the disclosure.

FIG. 4 is a flowchart of extracting actual object illumination of an image according to an embodiment of the disclosure.

Referring to FIG. 4, n operation S130, actual object illumination 70 of the image can be extracted. The goal of operation S130 is to extract actual object illumination using an edge-preserving fast global smoothing (FGS) filter, which reveals low-frequency brightness transitions and preserves harsh shadows to be removed in subsequent operation of inpainting relightened image into the input image sequence. In operation S130.1, the object blobs 50 can be detected by object landmarks L and object surface mask $A_r$, and object brightness transitions 55 can be detected on the object crop image 5, the detected object blobs 50 and object brightness transitions 55 being object features 45. The object brightness transitions 55 define unique features of the object. In the embodiment where object is a face, the blobs 50 comprise, but are not limited to, brows, eyes, nose and mouth. To further improve processing of object blobs 50, in operation S130.1, an object blob mask $A_b$ can be additionally formed from the object blobs 50. In the embodiment where the object blob mask is additionally formed, the resulting object blob mask may comprise, similar to the object blobs 50 as such, but not limited to, brows, eyes, nose and mouth. The detection of object brightness transitions 55 can be performed in operation S130.1:

$$S = |(D_x * F_{avg} * Y_l')^2 + (D_y * F_{avg} * Y_l')^2 - (D_x * Y_l')^2 + (D_y * Y_l')^2|,$$

where:

S is object brightness transitions map representing unique features of the object;

$Y_1'$ is Y channel of object crop image $R_1'$ 5;

$F_{avg}$ is averaging box filter of size $$w_f = \left[\alpha w_f + \frac{(1-\alpha w)}{13}\right], \alpha = 0,7,$$

$w_f$ is face width;

$D_x = (D_y)^T$ are difference operators $D_x = \{d_{ij}\}$, and $$d_{ij} = \begin{cases} 1, & i < \frac{w_f}{2}, \\ -1, & i > \frac{w_f}{2}, \\ 0, & \text{otherwise} \end{cases} \text{ of size } w_f.$$

Then, values S can be saturated to $$[2e10^4; 3e10^4] \cdot \frac{w_f(w_f - 1)}{600}$$

and normalized in [0; 1] interval.

In operation S130.2, based on the detected object features 45, a λ map 60 can be generated, which represents at least one region to be subjected to the greatest smoothing, at least one region to be subjected to the least smoothing, and zero or more regions to be subjected to smoothing within the range from the greatest to the least smoothing. The λ map 60 is generated in operation S130.2:

$$\Lambda = \lambda_{avg}S(1-A_b) + \lambda_{blob}A_b, \lambda_{avg} = 2500 + \frac{w}{40}, \lambda_{blob} = 300.$$

Figure 13:
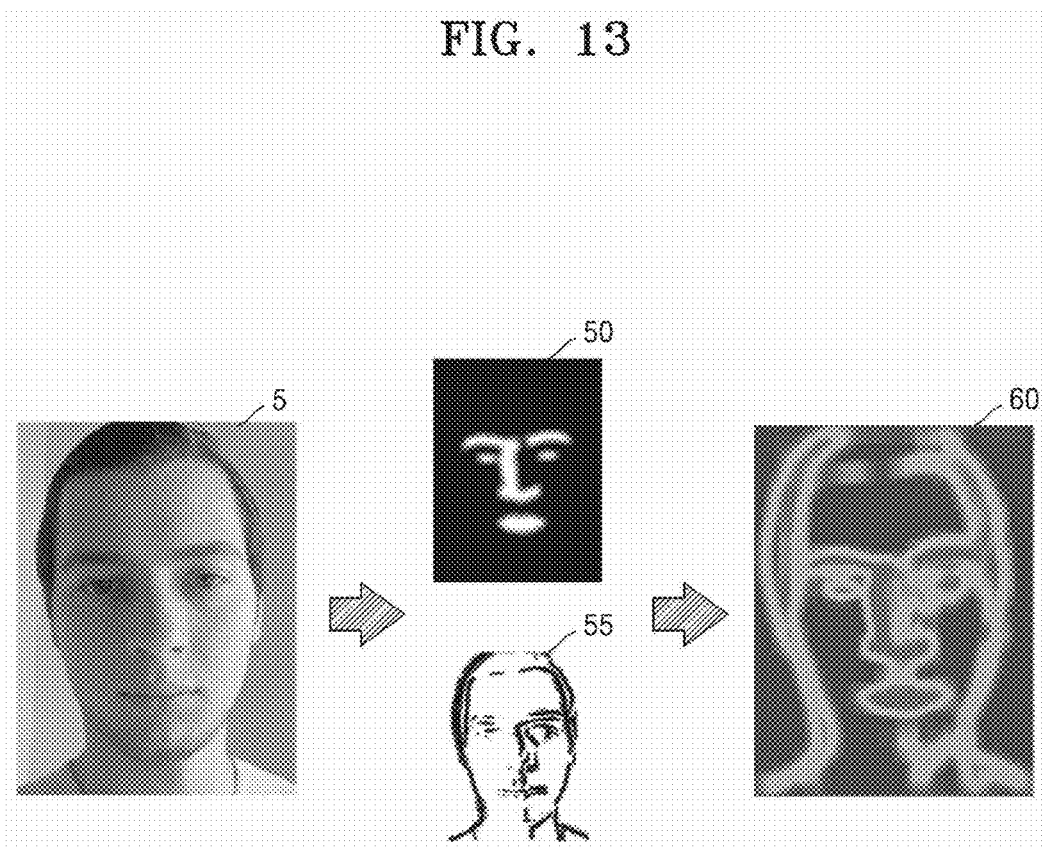
FIG. 13 is an example of detected object features such as object blobs and object brightness transitions, and an $\lambda$ map formed for an object crop image according to an embodiment of the disclosure.

FIG. 13 shows an example of detected object features such as object blobs 50 and object brightness transitions 55, and a λ map 60 for an object crop image 5 according to an embodiment of the disclosure.

Referring to FIG. 13, in operation S130.3, FGS with account of object features 45 can be performed by applying a FGS filter 65 with the λ map 60 to the object crop image 5 to extract actual object illumination 70 on image. Actual object illumination 70 can be represented as a separate actual object illumination image I. In operation S130.3, object features-guided FGS can be performed by solving optimization problem using the approach with, but not limited to, FGS filter (or similar) to obtain actual object illumination 70:

$$\Sigma_p((I^p - (R_l')^p)^2 + \lambda^p \Sigma_{q \in N(p)} w_{p,q}(R_l')(I^p - I^q)^2) \to \min,$$
$$\Lambda = \{\lambda^p\}.$$

Implementation of this operation is described e.g. in document [1] by Min et al. "Fast global image smoothing based on weighted least squares." IEEE Transactions on Image Processing 23.12 2014): 5638-5653.

Figure 14:
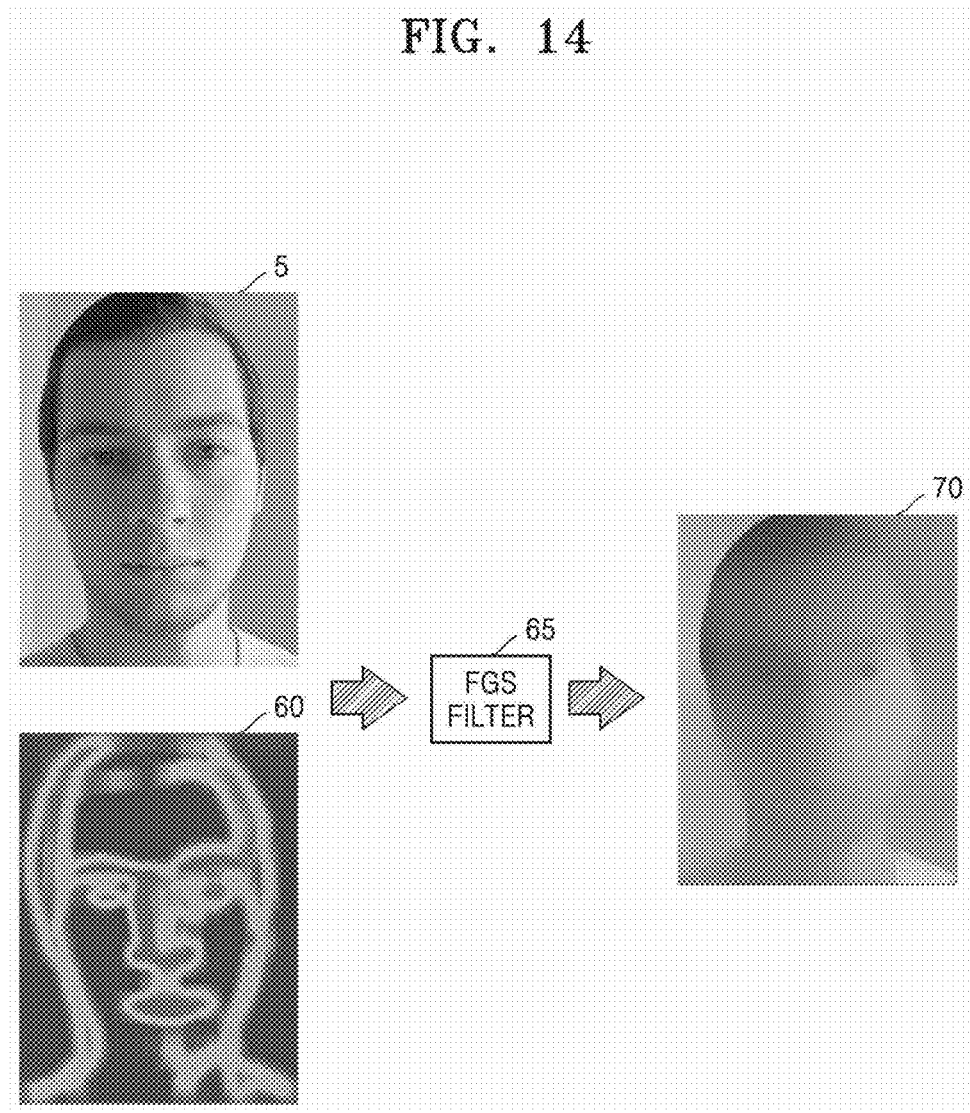
FIG. 14 is an example of results of fast global smoothing (FGS) taking into account object features according to an embodiment of the disclosure.

FIG. 14 shows an example of results of FGS with account of object features according to an embodiment of the disclosure.

Figure 5:
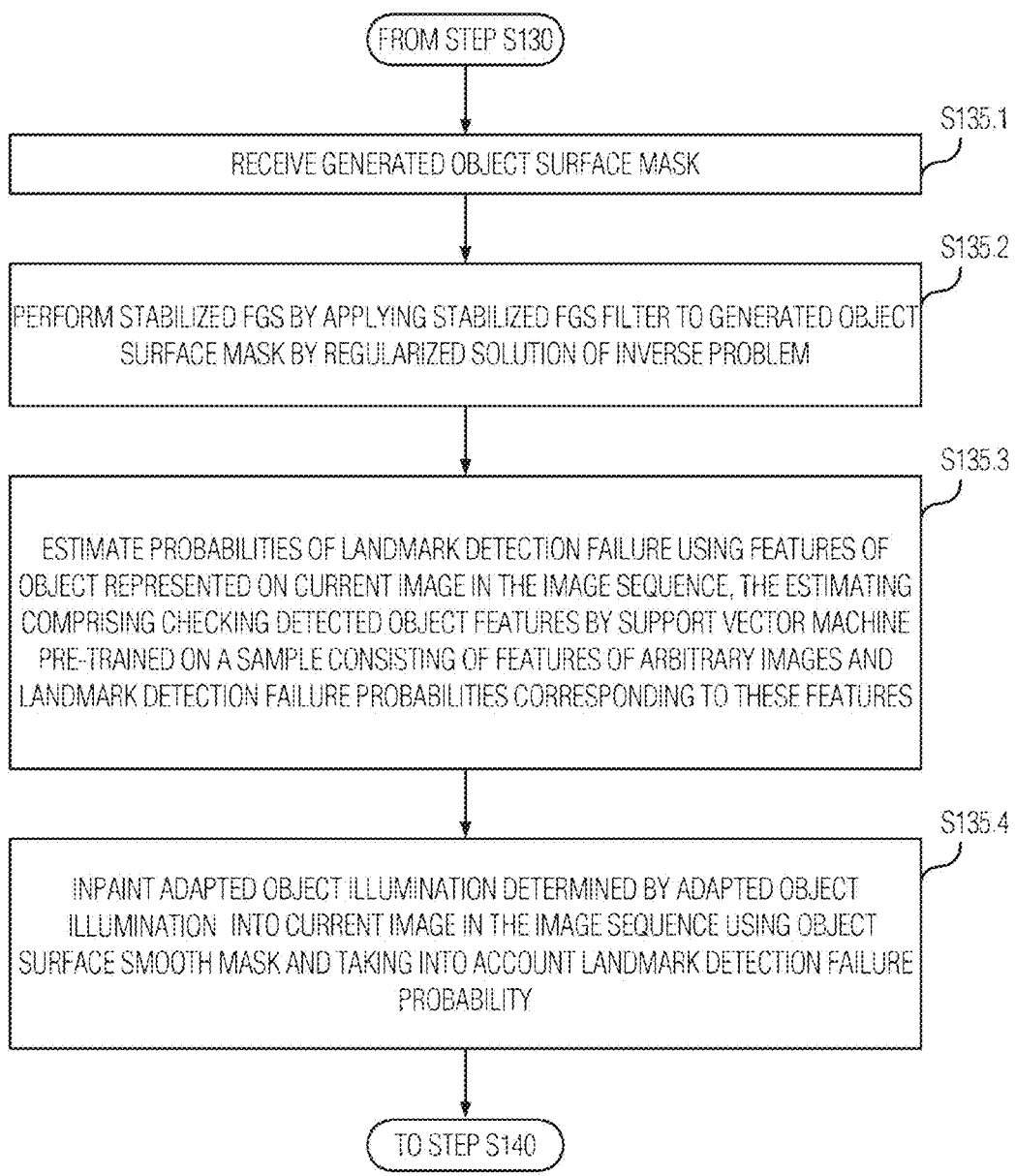
FIG. 5 is a flowchart of replacing the actual object illumination of an image with adapted object illumination according to an embodiment of the disclosure.

FIG. 5 is a flowchart of replacing the actual object illumination of an image with adapted object illumination according to an embodiment of the disclosure.

Referring to FIG. 5, a flowchart of operation S135 is illustrated. In operation S135, the actual object illumination 70 on image 5 can be replaced with adapted object illumination defined by the adapted object illumination 40. The goal of operation S135 is to relight the object on image and inpaint the relighted object into current image (frame) in the image sequence (video) using the object surface smooth mask and taking into account probabilities of landmark detection failure. This operation allows stabilized inpainting of relighted object image into input video frame on the basis of the generated object surface mask, stabilized FGS filter, and an error checker. Operation S135 enables continuous real-time video processing without noticeable flicker and artifacts associated with critical rotation angles of the object face surface on image. In addition, operation S135 improves performance of the illumination manipulation method owing to the lightweight inpainting algorithm which allows using the present method even in a mobile device with limited processing power for real-time video processing.

In operation S135.1, the generated object surface mask $A_r$ defined by the object surface region $A_s$ can be received/entered. In operation S135.2, stabilized FGS can be performed by applying stabilized FGS filter to the object surface mask $A_r$ by regularized solution of the following optimization (reverse) problem:

$$\sum_p \left( (A_s^p - A_r^p)^2 + \lambda \sum_{q \in N(p)} w_{p,q}(R_l')(A_s^p - A_s^q)^2 + \beta \left( A_s^p - 2\sum_t ((A_s^p)^t - (A_s^p)^{t-1}) \right) \right) \to \min$$

to find $A_s$, which solution can be found in close matrix form (see Min et al.):

$$(I + \lambda A)A_s = \frac{A_r + 2\beta B}{1 + \beta}, \quad (1)$$

where A is Laplacian matrix, $B = A_s^t + \Sigma_t(A_s^t - A_s^{t-1})$, t=1 ... T, $A_s:A_s^0$.

More specifically, regularized solution of optimization problem may comprise: adding a regularizer to the object surface mask—

$$A_{FGS} = \frac{1}{1+\beta}(A_r + 2\beta(A_{prev} + A_\Delta)), \beta$$

may be equal to 0.8, but not limited to this particular value; applying stabilized FGS filter by solving the problem (1) to obtain $A_{int}$; updating difference map $A_\Delta = \alpha A_\Delta + (1-\alpha)(A_{int} - A_{prev})$; updating object surface mask $A_{prev} \leftarrow A_{int}$; normalizing mask $A_{int}$ to obtain smooth mask $A_s = A_{int}/\max(A_{int})$.

In operation S135.3, probabilities of landmark detection failure can be estimated using features of the object represented in the currently processed image in the image sequence, the estimation comprising checking the detected object features by a support vector machine pre-trained on a sample consisting of features of arbitrary images and respective landmark detection failure probabilities. The operation of training a support vector machine (SVM) on a sample consisting of features of arbitrary images and respective landmark detection failure probabilities can be performed in advance. SVM training can be carried out by any method. The object landmark detection failure probability $p_f$ can be estimated by applying pre-trained SVM to some features X of current image.

In operation S135.4 the adapted object illumination defined by the adapted object illumination can be inpainted into current image in the image sequence with application of the object surface smooth mask and taking into account the object landmarks detection failure probability $p_f$. In one embodiment, the inpainting can be performed as follows:

$$R_0 = \left(1 + 0.5 p_f A_s S\left(\frac{M}{I} - 1\right)\right) R_I,$$

where:

$R_0$ is the result of inpainting of the adapted object illumination image into input image $R_I$;

$A_s$ is the object surface region;

S is the object brightness transitions map representing unique features of the object;

M is the adapted object illumination 40 with smooth object blobs; and

I is the actual object illumination image.

The operation of inpainting is carried out to remove harsh shadows of the object while preserving its unique features. Harsh shadows are removed by applying Lambert model with replacement $$\left(\frac{M}{I}\right)$$

of actual object illumination with adapted illumination, while object unique features are preserved by applying at this operation the map of object brightness transitions that must be saved. In operation S140, the image in the image sequence, in which actual object illumination has been replaced with adapted object illumination, can be displayed.

Figure 7:
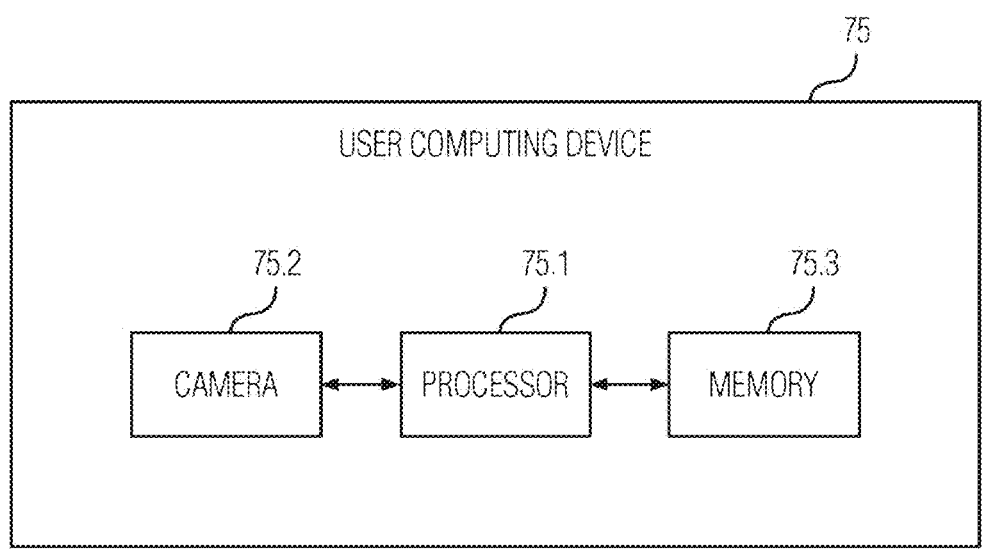
FIG. 7 is a schematic diagram of a user computing device implementing a method of performing object illumination manipulation on an image according to an embodiment of the disclosure.

FIG. 7 shows a schematic diagram of a user computing device implementing a method of performing object illumination manipulation on an image according to an embodiment of the disclosure.

Referring to FIG. 7, a user computing device 75 (e.g. a mobile device), in which the present method can be implemented, may comprise, but not limited to, a processor 75.1, a camera 75.2, and a memory 75.3 storing processor-executable instructions, which, when executed by the processor 75.1, cause the processor 75.1 to perform any operation(s) of the disclosed object illumination manipulation method. The user computing device 75 may comprise other components not shown in FIG. 15 and be e.g. a smartphone, tablet, virtual reality glasses, augmented reality goggles, PC, laptop, smart watch, etc. In an alternative embodiment of the computing device/mobile device 75, the device may comprise separate hardware units. In this embodiment, each hardware unit may be responsible for executing a respective operation or suboperation of the method and be appropriately named, for example, a device hardware unit responsible for image input (see operation S100) may be referred to as image input interface, and so on. However, the disclosure should not be limited to only such structure of units since those skilled in the art will envisage other possible structures of units in the device, where e.g. one hardware unit may be responsible for several operations or suboperations of the method, or performance of several operations or suboperations can be shared between two or more units. Furthermore, the present method can be implemented by a processor, application specific integrated circuit (ASIC), field programmable gate array (FPGA), or, in some embodiments, system-on-a-chip (SoC). In addition, the present method can be implemented by a computer-readable medium storing computer-executable instructions that, when executed by a computer processor, cause the computer to execute the method.

Figure 15:
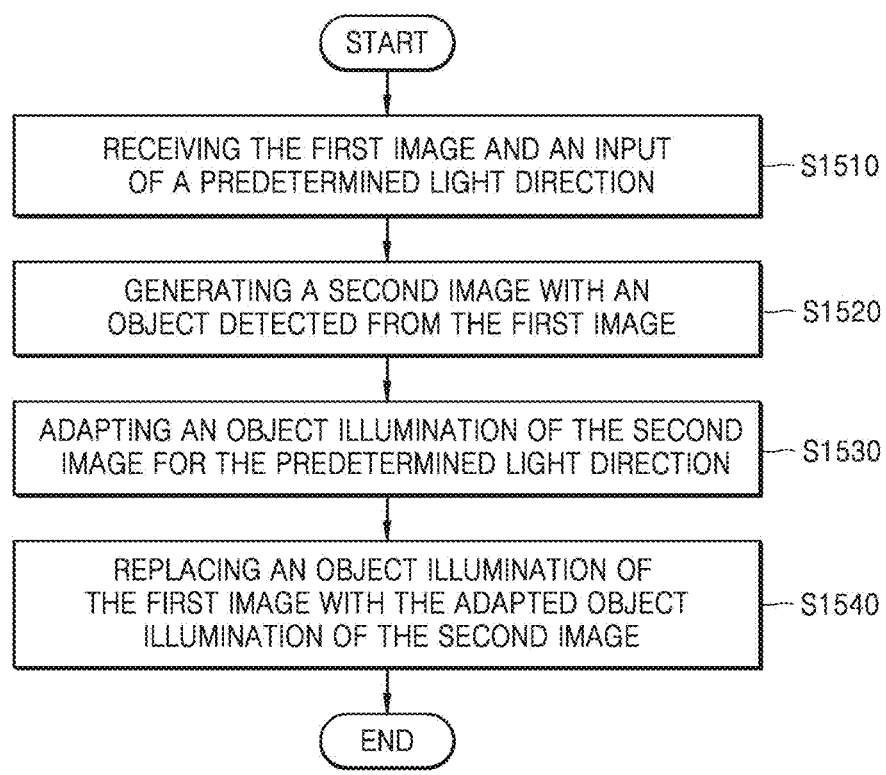
FIG. 15 is a flowchart of performing an illumination manipulation operation according to an embodiment of the disclosure.

FIG. 15 is a flowchart of performing an illumination manipulation operation according to an embodiment of the disclosure.

Referring to FIG. 15, an illumination manipulation device 1600 may perform object illumination manipulation on a first image according to an order illustrated in FIG. 15.

In operation S1510, the illumination manipulation device 1600 may receive the first image and an input of a predetermined light direction. The predetermined light direction may be a default light direction or a user-defined light direction. A user may perform object illumination manipulation on the first image based on a light direction applied to the predetermined light direction.

For example, when a figure is captured against the light, the user may determine a light direction as a front or a side of the object and may adjust illumination on the image to generate an image captured by receiving light in the determined light direction.

In operation S1520, the illumination manipulation device 1600 may generate a second image with an object detected from the first image. The illumination manipulation device 1600 may detect an object landmark in the first image and may obtain a second image by cropping all but the detected landmark from the first image. The object may be an essential portion of an object which is focused on by a photographer capturing the first image.

For example, in an image of an upper body of a human being, the object may be the person and the object landmark may be a face of the person.

In this case, the illumination manipulation device 1600 may obtain the second image, in which only the object is enlarged.

In operation S1530, the illumination manipulation device 1600 may adapt an object illumination of the second image for the predetermined light direction. The illumination manipulation device 1600 may generate a generic object illumination by using the second image and the predetermined light direction.

The generic object illumination may denote an illumination in the case in which a generic 3D mesh is fitted to the object landmark and then the photographing is performed by receiving light in the determined light direction. The generic object illumination may be generated by applying a generic object texture, and thus, a color or a shape thereof may be different from an object on an actual image.

The illumination manipulation device 1600 may generate an adapted object illumination based on the generic object illumination and an object feature obtained from the second image.

The adapted object illumination may be generated by stretching borders of the generic object illumination to borders of the second image, adjusting the stretched generic object illumination with a brightness and a color of the second image to reflect a brightness and a color of an actual image, and performing a blob smoothing operation on the adjusted generic object illumination.

In operation S1540, the illumination manipulation device 1600 may extract actual object illumination from the second image.

The illumination manipulation device 1600 may replace an object illumination of the first image with the adapted object illumination of the second image with the following operations.

First, the illumination manipulation device 1600 may detect blobs detected from an object surface mask based on the object landmark and shadows detected from the second image, as object features.

Here, the object surface mask may be generated by estimating a color factor from the second image to an object mask generated based on the object landmark, and finding an object surface region by using the estimated color factor.

Second, the illumination manipulation device 1600 may generate, based on the detected object features, a λ map representing at least one region to be subjected to the greatest smoothing and at least one region to be subjected to the least smoothing, and zero or more regions to be subjected to smoothing within the range from the greatest smoothing to the least smoothing.

Next, the illumination manipulation device 1600 may extract the actual object illumination by performing features-guided FGS by applying a FGS filter with the λ map to the second image.

The illumination manipulation device 1600 may maintain the object features while removing harsh shadows, by using the features-guided FGS.

The illumination manipulation device 1600 may replace the actual object illumination on the second image with adapted object illumination.

The illumination manipulation device 1600 may obtain an object surface smooth mask by performing stabilized FGS by applying a stabilized FGS filter to the object surface mask.

The illumination manipulation device 1600 may restore the replaced second image to the original sequence of images.

The illumination manipulation device 1600 may perform seamless video processing without noticeable flicking or extreme face angle artifacts by restoring the replaced second image to the original sequence of images by using the generated object surface smooth mask. The illumination manipulation device 1600 may estimate probabilities of an object detection failure using features of the object with respect to the first image and restore the adapted object illumination to the first image using the object surface smooth mask and the probabilities of the object detection failure.

Also, the illumination manipulation device 1600 may perform light weight inpainting with the improved performance.

Figure 16:
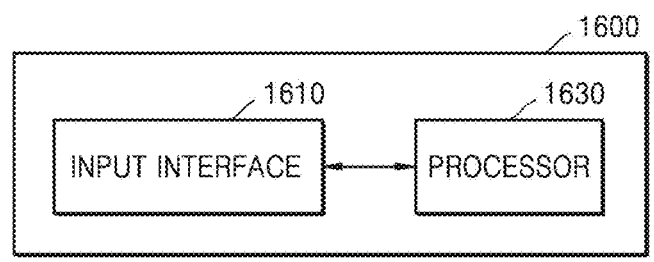
FIG. 16 is a structural diagram of an illumination manipulation device for performing an illumination manipulation operation according to an embodiment of the disclosure.

FIG. 16 is a structural diagram of the illumination manipulation device for performing illumination manipulation according to an embodiment of the disclosure.

Referring to FIG. 16, an illumination manipulation device 1600 may include an input interface 1610 and a processor 1630.

The input interface 1610 may receive an input of a first image in a sequence of images and an input of a predetermined light direction. The input may be automatically performed by a system or manually performed by a user.

The processor 1630 may perform operations S1510 to S1540 of FIG. 15.

Figure 17:
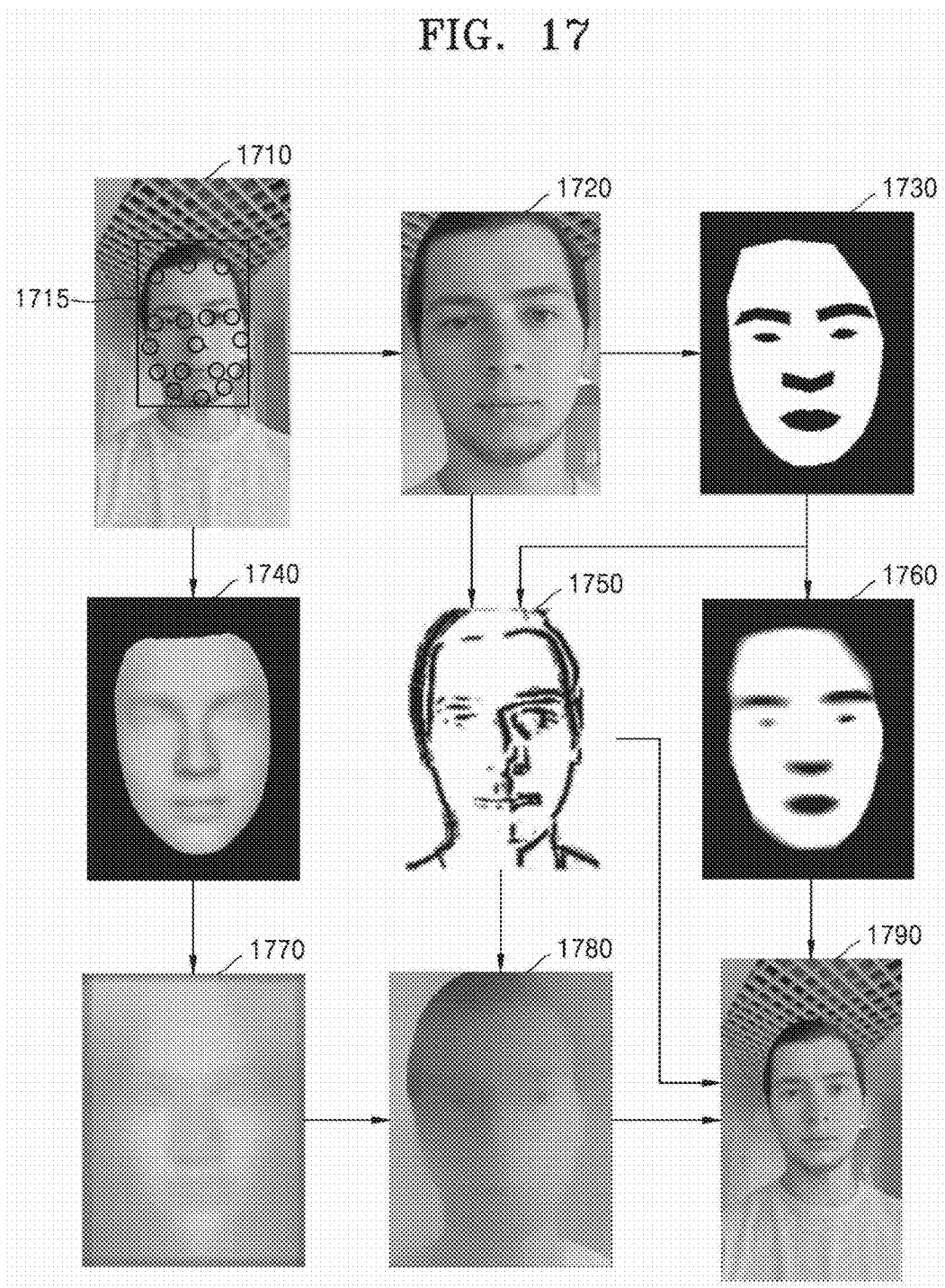
FIG. 17 illustrates an example of a process of manipulating illumination when an object of an image is a face according to an embodiment of the disclosure.

FIG. 17 illustrates an example of a process of manipulating illumination when an object of an image is a face according to an embodiment of the disclosure.

Referring to FIG. 17, an example of the first image 1710. A plurality of object landmarks 1715 may be detected from the first image 1710.

The illumination manipulation device 1600 may generate second image 1720 by cropping image to the object landmarks 1715.

An object surface mask 1730 may be generated by estimating a color factor from the second image 1720 and finding an object surface region by using the estimated color factor.

A generic object illumination 1740 may be generated by fitting a generic 3D mesh to the object landmarks 1715 and performing photographing via receiving light in a determined light direction.

A stretched illumination 1770 is generated by stretching borders of the generic object illumination 1740 to borders of the second image 1720.

An object feature 1750 including blobs is detected from the object surface mask 1730 based on the object landmark 1715 and shadows that are detected from the second image 1720.

An adapted object 1780 is generated by reflecting a brightness and a color of an actual image by adjusting the generic object illumination 1770 with a brightness and a color of the second image 1720, and performing a blob smoothing operation on the adjusted object illumination.

The adjusting of the generic object illumination 1770, which includes the stretched borders with the brightness and the color of the second image 1720, may comprise calculating Y, U, and V histograms of the generic object illumination, calculating Y, U, and V histograms of the second image 1720, equalizing the U and V histograms of the generic object illumination and the calculated U and V histograms of the second image 1720, adjusting the generic object illumination with the Y histograms of the second image and the generic object illumination, and applying the equalized U and V histograms of the generic object illumination and the second image to the generic object.

An object surface smooth mask 1760 is generated by applying a stabilized FGS filter to the object surface mask 1730.

A sequence of images 1790 are restored by replacing the actual illumination with respect to the second image with the adapted illumination 1780 and using the replaced image, the object feature 1750, and the object surface smooth mask 1760.

As described above, according to the one or more of the above embodiments, the method can preserve unique object features on image and remove harsh shadows using object features-guided FGS. In addition, the present method can process colored lighting of objects and preserves unique color of the object due to the use of adapted object illumination. Furthermore, the present method is adapted for continuous video processing in real time due to the use of stabilized FGS filter. Therefore, the disclosure enhances general efficiency and quality of real-time processing of images in an image sequence, and the processing itself is feasible on a user computing device or mobile device.

The method according to an embodiment of the disclosure may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the disclosure or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing an object illumination manipulation operation on a first image, the method comprising:
   receiving the first image and an input of a predetermined light direction, the predetermined light direction comprising one of a default light direction or a user-defined light direction;
   generating a second image with a first object detected from the first image;
   fitting a generic three dimensional (3D) mesh to a second object in the second image;
   applying illumination defined by the predetermined light direction to the generic 3D mesh fitted to the second object;
   determining a second object illumination of the second image based on the predetermined light direction and the generic 3D mesh fitted to the second object; and
   replacing a first object illumination of the first image with the second object illumination.

2. The method of claim 1, wherein the determining of the second object illumination further comprises:
   resizing the second object illumination to correspond to a size of the second image;
   after resizing the second object illumination, adjusting the second object illumination based on a brightness and a color of the second image; and
   after adjusting the second object illumination, smoothing the second object illumination.

3. The method of claim 2, wherein the adjusting of the second object illumination comprises:
   calculating Y, U, and V histograms of the second object illumination;
   calculating Y, U, and V histograms of the second image;
   equalizing the U and V histograms of the second object illumination and the U and V histograms of the second image;
   adjusting the second object illumination with the Y histograms of the second image and the second object illumination; and
   applying the equalized U and V histograms of the second object illumination and the second image to the second object illumination.

4. The method of claim 1, wherein the replacing of the first object illumination comprises:
   detecting blobs from an object surface mask based on the first object and shadows from the second image;
   generating, based on the blobs, $\lambda$ map representing at least one region corresponding to a greatest smoothing, at least one region corresponding to a least smoothing, and zero or more regions corresponding to a smoothing within a range from the greatest smoothing to the least smoothing; and
   extracting an actual object illumination with the $\lambda$ map.

5. The method of claim 4, wherein the extracting of the actual object illumination comprises applying a features-guided fast global smoothing (FGS) filter with the $\lambda$ map to the second image to generate the actual object illumination.

6. The method of claim 4, further comprising:
   generating an object mask based on the first object;
   estimating a color factor from the object mask and the second image; and
   finding an object surface region based on the color factor.

7. The method of claim 6, wherein the replacing of the first object illumination comprises:
   performing a stabilized fast global smoothing (FGS) on the object surface mask to obtain an object surface smooth mask.

8. The method of claim 7, wherein the replacing of the first object illumination further comprises:
   estimating probabilities of an object detection failure based on features of the first object in the first image; and
   restoring the first image to the first object illumination based on the object surface smooth mask and the probabilities of the object detection failure.

9. The method of claim 4,
   wherein the first object is a face,
   wherein a surface of the first object is skin of the face, and
   wherein the blobs comprise at least one of brows, eyes, nose or mouth.

10. A device for performing an object illumination manipulation operation on a first image, the device comprising:
    an input interface configured to receive the first image and an input of a predetermined light direction, the predetermined light direction comprising one of a default light direction or a user-defined light direction; and
    a processor configured to:
       generate a second image with a first object detected from the first image,
       fit a generic three dimensional (3D) mesh to a second object in the second image,
       apply illumination defined by the predetermined light direction to the generic 3D mesh fitted to the second object,
       determine a second object illumination of the second image based on the predetermined light direction and the generic 3D mesh fitted to the second object, and
       replace a first object illumination of the first image with the second object illumination.

11. The device of claim 10, wherein, in response to determining the second object illumination, the processor is further configured to:
    resize the second object illumination to correspond to a size of the second image, after the second object illumination is resized, adjust the second object illumination based on a brightness and a color of the second image, and after the second object illumination is adjusted, smooth the second object illumination.

12. The device of claim 11, wherein, in response to adjusting the second object illumination, the processor is further configured to:

calculate Y, U, and V histograms of the second object illumination, calculate Y, U, and V histograms of the second image, equalize the U and V histograms of the second object illumination and the U and V histograms of the second image, adjust the second object illumination s with the Y histograms of the second image and the second object illumination, and apply the equalized U and V histograms of the second object illumination and the second image to the second object illumination.

13. The device of claim 10, wherein the processor further is configured to:

detect blobs from an object surface mask based on the first object and shadows from the second image, generate, based on the blobs, a λ map representing at least one region corresponding to a greatest smoothing, at least one region corresponding to a least smoothing, and zero or more regions corresponding to a smoothing within a range from the greatest smoothing to the least smoothing, and extract an actual object illumination with the λ map.

14. The device of claim 13, wherein the processor is further configured to:

generate an object mask based on the first object, estimate a color factor from the object mask and the second image, and find an object surface region based on the color factor.

15. The device of claim 14, wherein the processor is further configured to replace the actual object illumination on the second image based on a stabilized fast global smoothing (FGS) operation applied to the object surface mask thereby obtaining an object surface smooth mask.

16. The device of claim 15, wherein the processor is further configured to:

estimate probabilities of an object detection failure based on features of the first object in the first image, and restore the first image to the first object illumination based on the object surface smooth mask and the probabilities of the object detection failure.

17. The device of claim 13, wherein the first object is a face, wherein a surface of the first object is skin of the face, and wherein the blobs comprise at least one of brows, eyes, nose or mouth.

18. A non-transitory computer-readable recording medium configured to store one or more computer programs including instructions which, when executed by at least one processor, cause the at least one processor to control to:

receive a first image and an input of a predetermined light direction, the predetermined light direction comprising one of a default light direction or a user-defined light direction;

generate a second image with a first object detected from the first image;

fit a generic three dimensional (3D) mesh to a second object in the second image;

apply illumination defined by the predetermined light direction to the generic 3D mesh fitted to the second object;

determine a second object illumination of the second image based on the predetermined light direction and the 3D generic mesh fitted to the second object; and replace a first object illumination of the first image with the second object illumination.

19. The method of claim 1, further comprising:

detecting centers of object reference regions in the first image that correspond to landmark regions, wherein the landmark regions are predetermined with a pattern associated with the first object;

generating a polygon based on the landmark regions; and generating an object surface mask based on the landmark regions.

20. The method of claim 19, wherein the fitting of the generic 3D mesh comprises distorting geometry of the generic 3D mesh based on the landmark regions.

21. The method of claim 20, wherein the second object illumination is further generated based on the distorted 3D mesh.

* * * * *